(12) United States Patent
Stählin et al.

(10) Patent No.: US 10,454,838 B2
(45) Date of Patent: Oct. 22, 2019

(54) METHOD FOR DETERMINING A CHANNEL LOAD AND METHOD FOR ADJUSTING A PREPROCESSING IN A VEHICLE-TO-X COMMUNICATION, VEHICLE-TO-X COMMUNICATION SYSTEM AND COMPUTER-READABLE STORAGE MEDIUM

(71) Applicant: Continental Teves AG & Co. oHG, Frankfurt (DE)

(72) Inventors: Ulrich Stählin, Eschborn (DE); Richard Scherping, Liederbach am Taunus (DE); Marc Menzel, Weimar (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 30 days.

(21) Appl. No.: 15/551,729

(22) PCT Filed: Apr. 14, 2016

(86) PCT No.: PCT/EP2016/058250
§ 371 (c)(1),
(2) Date: Aug. 17, 2017

(87) PCT Pub. No.: WO2016/166230
PCT Pub. Date: Oct. 20, 2016

(65) Prior Publication Data
US 2018/0069800 A1    Mar. 8, 2018

(30) Foreign Application Priority Data
Apr. 17, 2015   (DE) ........................ 10 2015 207 050

(51) Int. Cl.
H04W 4/40        (2018.01)
H04L 12/841      (2013.01)
(Continued)

(52) U.S. Cl.
CPC .............. *H04L 47/28* (2013.01); *H04L 47/30* (2013.01); *H04L 47/31* (2013.01); *H04W 4/046* (2013.01);
(Continued)

(58) Field of Classification Search
None
See application file for complete search history.

(56) References Cited

U.S. PATENT DOCUMENTS 5,483,533 A * 1/1996 Kuba .................. H04L 47/10
                                                340/2.7
8,892,347 B1 * 11/2014 Ibrahim ................ G08G 1/093
                                                701/300
(Continued)

FOREIGN PATENT DOCUMENTS

DE    102013213606 B3    8/2014
DE    102014213771 A1    2/2015
(Continued)

OTHER PUBLICATIONS

International Search Report and Written Opinion for International Application No. PCT/EP2016/058250, dated Jun. 1, 2016, 10 pages.
(Continued)

*Primary Examiner* — Ayanah S George
(74) *Attorney, Agent, or Firm* — RatnerPrestia

(57) ABSTRACT

A method for determining a channel load in a vehicle-to-X communication, a method for adjusting a preprocessing in a vehicle-to-X communication, a vehicle-to-X communication system and a storage medium. In particular, a preprocessing can be adjusted in a vehicle-to-X communication, for example a filtering out of vehicle-to-X messages, to the channel load and/or to a system power by the method according to the invention.

17 Claims, 1 Drawing Sheet

(51) Int. Cl.
- *H04W 4/04* (2009.01)
- *H04W 28/02* (2009.01)
- *H04L 12/835* (2013.01)
- *H04L 12/833* (2013.01)

(52) U.S. Cl.
CPC ......... *H04W 4/40* (2018.02); *H04W 28/0252* (2013.01); *H04W 28/0284* (2013.01); *B60W 2550/40* (2013.01)

(56) References Cited

U.S. PATENT DOCUMENTS

| | | | | |
|---|---|---|---|---|
| 2003/0026498 | A1* | 2/2003 | Sirtori | H04N 7/012 382/278 |
| 2006/0095637 | A1* | 5/2006 | Hirayama | G06F 13/1605 710/309 |
| 2006/0245359 | A1* | 11/2006 | Hosein | H04L 47/10 370/235 |
| 2011/0258444 | A1* | 10/2011 | Chayat | H04L 63/06 713/168 |
| 2014/0143834 | A1 | 5/2014 | Stahlin et al. | |
| 2016/0197797 | A1 | 7/2016 | Grotendorst et al. | |
| 2016/0197825 | A1 | 7/2016 | Grotendorst et al. | |
| 2016/0203711 | A1 | 7/2016 | Scherping et al. | |

FOREIGN PATENT DOCUMENTS

| | | | |
|---|---|---|---|
| DE | 102014216776 A1 | 2/2015 | |
| GB | 2466208 A * | 6/2010 | ......... H04L 43/0852 |
| WO | 2015025048 A2 | 2/2015 | |

OTHER PUBLICATIONS

German Search Report for German Application No. 10 2015 207 050.6, dated Oct. 14, 2015, including partial English translation, 10 pages.

"Recommendation ITU-R M.1371-4—Technical characteristics for an automatic identification system using time-division multiple access in the VHF maritime mobile band," Apr. 30, 2010, XP055273002, Retrieved from the Internet: URL:https://www.itu.int/dms_pubrec/itu-r/rec/m/R-REC-M.1371-4-201004-S!!PDF-E.pdf [retrieved on May 17, 2016].

International Preliminary Report on Patentability and Written Opinion for International Application No. PCT/EP2016/058250, dated Oct. 17, 2017, 7 pages.

* cited by examiner

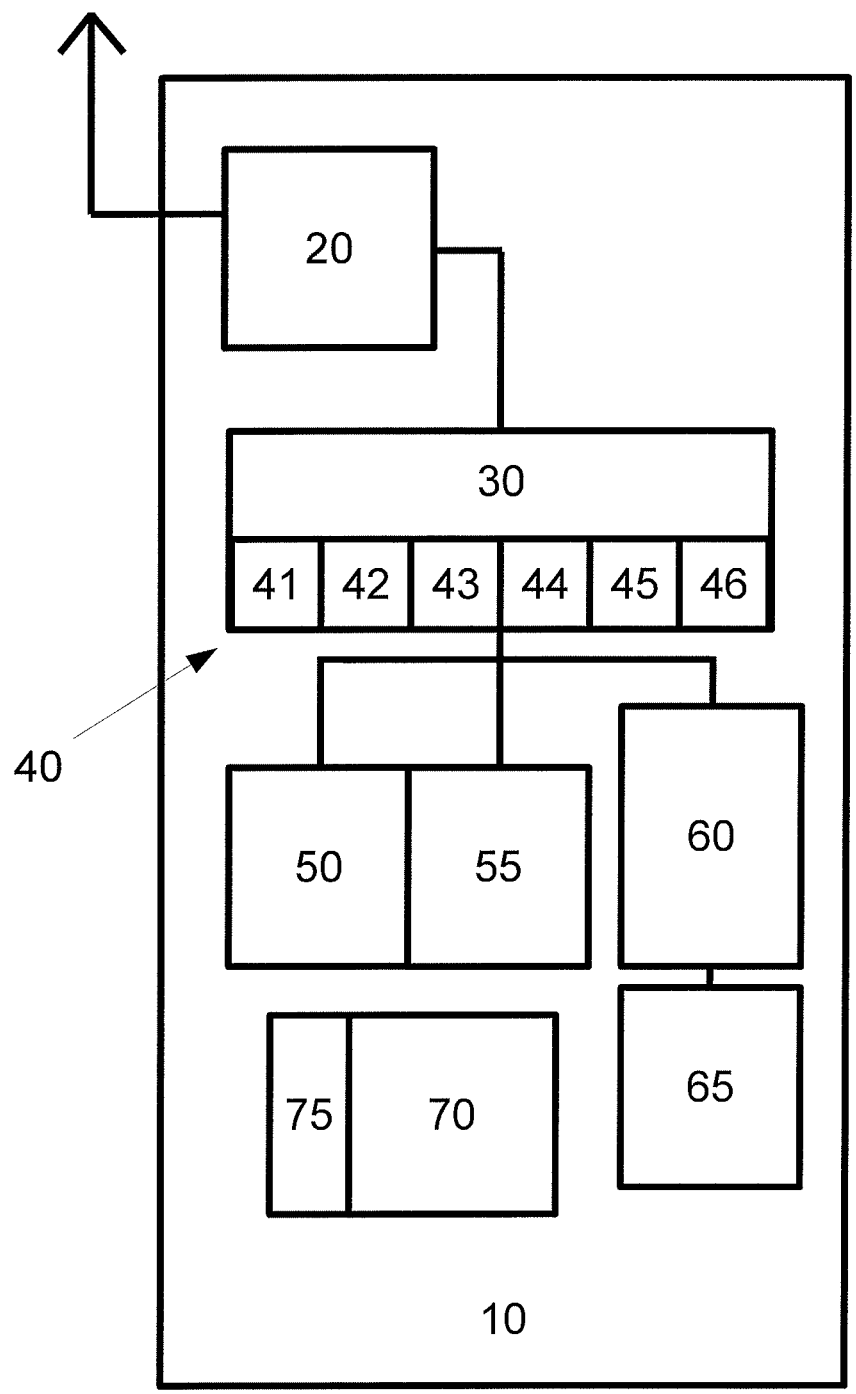

METHOD FOR DETERMINING A CHANNEL LOAD AND METHOD FOR ADJUSTING A PREPROCESSING IN A VEHICLE-TO-X COMMUNICATION, VEHICLE-TO-X COMMUNICATION SYSTEM AND COMPUTER-READABLE STORAGE MEDIUM

CROSS REFERENCE TO RELATED APPLICATIONS

This application is the U.S. National Phase application of PCT International Application No. PCT/EP2016/058250 filed Apr. 14, 2016, which claims priority to German Patent Application No. 10 2015 207 050.6, filed Apr. 17, 2015, the contents of such applications being incorporated by reference herein.

FIELD OF THE INVENTION

The invention relates to a method for determining a channel load in a vehicle-to-X communication as well as a vehicle-to-X communication system and a computer-readable storage medium for executing such a method.

BACKGROUND OF THE INVENTION

Vehicle-to-X communication, also referred to as car-to-X communication, C2X communication or V2X communication, is being standardized in Europe and the USA and is currently heading towards series production.

The volume of data received during vehicle-to-X communication is fundamentally very large in proportion to the data relevant to the specific applications executed in a vehicle. Frequently, only a few messages are really relevant to the applications; all of the other messages can in principle be discarded at an early stage by means of a preprocessing, in order to reduce the system load.

Even if the benefits and effectiveness of vehicle-to-X communication are based on a rapid introduction in as many vehicles as possible, it is unrealistic to assume that all vehicles will be equipped with the appropriate technology within a very short space of time. Particularly at the start of the market introduction of vehicle-to-X communication only a few vehicles will be equipped with the appropriate technology so that a preprocessing will not be necessary due to the small number of received messages. Only as vehicle-to-X communication becomes increasingly widespread will it become necessary to perform a preprocessing in order to adjust the messages actually processed to the system power. Over the course of a vehicle's life a change will therefore take place from a state in which sufficient computing power is available to be able to work without preprocessing to a state in which a preprocessing is required in order to continue to run the applications with the available computing power.

The document DE 10 2014 213 771 A1, which is incorporated by reference discloses a filtering method for adjusting a computing load to a computing capacity of a vehicle-to-X communication system, wherein vehicle-to-X messages are received and/or sent by means of the vehicle-to-X communication system, wherein the received vehicle-to-X messages require processing by the vehicle-to-X communication system, and wherein the filtering method decides which of the received vehicle-to-X messages are processed and which of the received vehicle-to-X messages are discarded.

The document US 2014/143834 A1, which is incorporated by reference discloses a method for selecting data in a vehicle-to-X communication system in order to reduce the complexity of a decoding.

The document "Recommendation ITU-R M.1371-4—Technical characteristics for an automatic identification system using time-division multiple access in the VHF maritime mobile band" (20100430), which is incorporated by reference discloses technical characteristics for an automatic identification system using time-division multiple access in the VHF maritime mobile band.

SUMMARY OF THE INVENTION

An aspect of the invention provides a method for determining a channel load in a vehicle-to-X communication as well as a method for adjusting a preprocessing in a vehicle-to-X communication which takes account of this presumed development. In addition, another aspect of the invention provides a vehicle-to-X communication system as well as a computer-readable storage medium in order to carry out such methods.

An aspect of the invention relates to a method for determining a channel load in a vehicle-to-X communication, which comprises the following steps:
receiving a number of vehicle-to-x messages,
establishing a number of channel load parameters based on the vehicle-to-x messages, and
establishing the channel load based at least on the channel load parameters.

An aspect of the invention provides a method for determining a channel load in a vehicle-to-X communication as well as a method for adjusting a preprocessing in a vehicle-to-X communication which takes account of this presumed development. It is, in addition, an object of the invention to provide a vehicle-to-X communication system as well as a computer-readable storage medium in order to carry out such methods.

It is possible, by means of the method according to an aspect of the invention, to first of all establish a number of channel load parameters which give some indication of the number of vehicle-to-X messages received and to be processed and also, if applicable, regarding the necessary computing power for this. To this end, it is possible to not only have recourse to a simple counting of messages, but channel load parameters can also be used, which take account of specially determined conditions with regard to the processing of particular messages and the outlay required for this as well as the required computing power. The channel load can therefore be determined in a considerably more suitable manner for a particular purpose, for example for adjusting a preprocessing in a vehicle-to-X communication, by means of the intermediate step of establishing a number of channel load parameters, than would be possible by simply having recourse to a simple, directly determined channel load. It is also possible to talk about a pseudo channel load or a virtual or generalized channel load. This does not, however, exclude the possibility that a simple, directly determined channel load which can be provided, for example, by a communication chip is used as the channel load parameter, including possibly as the single channel load parameter.

Examples of channel load parameters, which can be used individually or in any combination within the framework of the method, are provided below. It is understood that all of the desired quantities or combinations of the different channel load parameters described or the establishing rules thereof, which are indicated in this application, are an integral part of the disclosure of this application.

The channel load is typically indicated in a unit which indicates the number of messages in a unit of time, for example in the unit $s^{-1}$. However, it is understood that this can be a calculated variable which deviates from the number of messages actually received within the unit of time, for example a second.

According to one embodiment, a channel load parameter is established by counting the number of vehicle-to-X messages received within a predefined period of time. This corresponds to a simple counting of the number of received vehicle-to-X messages, as a result of which it is possible to draw an immediate conclusion about the messages sent by other vehicles or other units and received by the vehicle.

According to one embodiment, a channel load parameter is established by the following steps:
  storing each received vehicle-to-x message with a time stamp,
  establishing a time interval between two successively received vehicle-to-x messages, and
  establishing the channel load parameter based on the time interval.

It is understood that the time stamp preferably originates from an internal clock. However, another time reference, for example a global time reference such as a time reference received from a satellite navigation system or a time reference transmitted by radio, can also be used. In addition, it is understood that during the step of establishing the channel load parameter based on the time interval an inversion of the time interval is preferably carried out. If, for example, the interval between two received messages is 10 ms, this can be converted into a channel load parameter of $100\ s^{-1}$.

In the case of the procedure just described for establishing a channel load parameter, the process of counting messages can be dispensed with. Instead, recourse can be had to the time stamp which is frequently required anyway for various other purposes, for example for a correct assignment of the arrival of messages in the case of applications to which this is relevant. It is therefore possible to dispense with additional arithmetical operations which are required to count messages within a particular time interval.

In the case of the embodiment just described, the channel load parameter is established according to a further development based on an average or a median of a predefined number of time intervals. Therefore, not only is a time interval between two messages received immediately after one another used for establishing the channel load parameter, but multiple messages are enlisted in order to establish the channel load parameter or the respective intervals thereof from the previous and/or next message. In this case, it is possible to average over an arbitrary number of messages or over any predefined period or, alternatively, a median can be established. It is understood that calculation methods other than calculating an average or a median, for example calculating a weighted average, can also be used. Likewise, the calculation of an average or a median or another arithmetical operation cannot be performed until after inversion. The calculation method can, in this case, be used, for example, in blocks or with a moving time window.

According to one embodiment, a channel load parameter is established by the following steps:
  storing each received vehicle-to-x message in a buffer memory, wherein applications read out vehicle-to-x messages cyclically from the buffer memory in each case, and
  establishing the channel load parameter based on the number of vehicle-to-x messages stored in the buffer memory.

A channel load parameter determined in this way gives some immediate indication of the processing reserve in the buffer memory. In this case, a buffer memory preferably denotes a memory which stores received vehicle-to-X messages and makes them available for collection by the respective applications. The applications are, in this case, preferably configured such that some or all of the applications check whether relevant messages are present in the buffer memory at a particular, preferably individually adjustable or predefined interval, and then read out said messages from the buffer memory and process them. The buffer memory can, in this case, preferably provide messages for a plurality of different applications. Following the reading out, a particular application can delete the message in the buffer memory, so that space is available again for a new message, wherein the application preferably then and/or only then deletes the message if this is still not relevant to another application.

According to one embodiment, a channel load parameter is established by the following steps:
  storing each received vehicle-to-X message in a buffer memory, wherein applications read out vehicle-to-X messages cyclically from the buffer memory in each case,
  establishing a number of vehicle-to-X messages from the same transmitter, which are stored in the buffer memory, and
  establishing the channel load parameter based on the number of vehicle-to-X messages from the same transmitter.

It is considered by means of the procedure just described for establishing a channel load parameter that a particularly high channel load can be assumed, if multiple vehicle-to-X messages from the same transmitter are present in the buffer memory. This can, for example, be identified by a transmitter ID. This also gives some indication of the processing reserve of the applications. The statements already made above apply with regard to the buffer memory.

In this case, it can preferably be additionally established and considered on establishing the channel load parameter how many vehicle-to-X messages from the same transmitter are of the same type. In this case, a particularly high channel load can only be assumed, for example, if messages from the same transmitter are also of the same type.

Typical types used in a vehicle-to-X communication are, for example, Cooperative Awareness Message (CAM), Decentralized Environment Notification Message (DENM), Basic Safety Message (BSM), Signal Phase and Timing (SPAT) or topographic and map-related information (TOPO) message types. By considering types, account is taken of the fact that a transmitter can use different message types in quick succession, without this necessarily suggesting a particularly high channel load.

The buffer memory can be a first-in-first-out buffer memory. This is also referred to as a FiFo buffer memory. In this case, a message arriving later in the buffer memory is also typically read out later.

According to one embodiment, a channel load parameter is established by the following steps:
  storing vehicle-to-X messages, which are to be subjected to authentication, in a security buffer memory, and
  establishing the channel load parameter based on the number of messages stored in the security buffer memory.

The security buffer memory is, in this case, typically a buffer memory, from which a security unit reads out and authenticates the vehicle-to-X messages. This is preferably a first-in-first-out (FiFo) buffer memory. An authentication can be necessary, for example, if it is to be established whether the vehicle-to-X message originates from an authorized transmitter or if it is to be ensured that a vehicle-to-X message also actually originates from a particular, for example an indicated, transmitter. This therefore prevents unauthorized parties influencing the vehicle-to-X communication.

Typically, in the case of the procedure just described for establishing a channel load parameter based on a security buffer memory, only a small value of, for example, 1, 2 or 3 messages is tolerated in the security buffer memory before an increased channel load is already assumed. The reason for this is that, in the case of a security unit which verifies messages, no processing backlog can typically be tolerated. This would constitute a bottleneck of the entire system because unauthenticated messages could not be further processed.

According to one embodiment, a channel load parameter is a value received from a communication chip, which value is indicative of the channel load. A value received from a communication chip can therefore be used as one of multiple channel load parameters or, possibly, also as the single channel load parameter, which value immediately gives some indication of the channel load. It is understood that, in particular as a result of the combination of multiple other channel load parameters with a value received from a communication chip, a modification of the value received from the communication chip can be achieved, which value takes better account of the realities of the processing.

According to one embodiment, an increased channel load is established during the step of establishing the channel load, if at least one channel load parameter indicates an increased channel load. An increased channel load can also be established during the step of establishing the channel load if, for example, more than half of all the channel load parameters considered during the step of establishing the channel load indicate an increased channel load.

An increased channel load can, for example, be a channel load increased above a threshold. Therefore, the aim, in this case, is typically to determine whether the channel load exceeds a particular threshold. According to the first embodiment described above, such an increased channel load is already assumed if only one channel load parameter indicates the increased channel load, i.e. exceeds the threshold for example. In the case of the second embodiment described above, an increased channel load is only assumed if more than half of the channel load parameters indicate an increased channel load, i.e. exceed the threshold for example. It is understood that, instead of half of the channel load parameters used, another desired proportion of the channel load parameters used can also be used accordingly. These can also be weighted.

According to one embodiment, an increased channel load is only established during the step of establishing the channel load if one or more channel load parameters indicate an increased channel load over a predetermined time period. A temporal low-pass can also be applied during the step of establishing the channel load. Such embodiments can ensure that an increased channel load is not immediately assumed and appropriate action taken, during the short-term establishing of an increased channel load, i.e. during the short-term exceeding of a threshold for example. A temporal low-pass can, in this case, be realized, for example, by calculating a moving average or other known methods.

According to one embodiment, each vehicle-to-X message is weighted with a complexity factor when used in the establishment of a channel load parameter. The complexity factor is, in this case, a measure of the computing load to be expected during further processing steps. This makes it possible to take account of the fact that different messages need a different computing load during further processing steps.

For example, it can be considered whether a signature of a message is already known and/or verified. For example, a message with a signature which is already known or verified can be weighted with a factor of 0.5, whereas a message with a signature which is not already known or not yet verified is weighted with a factor of 1.

A distinction can also be made according to types of messages. For example, a Decentralized Environment Notification Message (DENM) can be weighted due to extensive subsequent calculations with a factor of 1.5, whereas a Cooperative Awareness Message (CAM) can be weighted with a factor of 1 and a MAP, TOPO or SPAT message can be weighted with a factor of 3 since the latter contain high amounts of data. A beacon-message can, for example, be rated with a factor 0.5.

It is understood that the indicated numerical values for weightings here are merely examples, and that respective intervals around the indicated values having a respective lower limit of 0.1, 0.2, 0.3, 0.4 or 0.5 below this value and an upper limit of 0.1, 0.2, 0.3, 0.4 or 0.5 above this value can in particular also be used. Such intervals with random combinations of lower and upper limits are deemed to be an integral part of the disclosure of this application.

In addition, an aspect of the invention relates to a method for adjusting a preprocessing in a vehicle-to-X communication, which comprises the following steps:
determining a channel load by means of a method according to the invention for determining a channel load in a vehicle-to-X communication,
establishing whether the channel load is increased above a preprocessing threshold,
and as a function thereof
carrying out a preprocessing, in particular a filtering out of vehicle-to-X messages, if the channel load is increased above the preprocessing threshold, as well as
not carrying out a preprocessing, in particular a filtering out of vehicle-to-X messages, if the channel load is not increased above the preprocessing threshold.

Using the method just mentioned, it is possible to ensure that a preprocessing, which typically filters out messages, is only effected if the channel load is so high that the processing capacity for processing the received vehicle-to-X messages is no longer sufficient without preprocessing. However, other stages of a preprocessing can also be controlled in the same way.

The method can be carried out, for example, in such a manner and/or can ensure that the same number of messages or approximately the same number of messages are always forwarded to applications in a unit of time, provided that enough messages are available. The preprocessing can, for example, be executed in such a manner that more or fewer messages are filtered out depending on the channel load.

A preprocessing, which filters out irrelevant or less relevant vehicle-to-X messages and thus prevents said messages being supplied to the applications or other processing steps, is typically assumed here. For example, a preprocessing threshold can adopt a value of 30 s$^{-1}$, 50 s$^{-1}$ or a value between 30 s$^{-1}$ and 50 s$^{-1}$.

According to one embodiment, the method further comprises the following steps:

establishing whether the channel load is increased above a monitoring threshold, wherein the monitoring threshold is lower than the preprocessing threshold, and as a function thereof carrying out monitoring if the channel load is increased above the monitoring threshold, as well as not carrying out monitoring if the channel load is not increased above the monitoring threshold.

It is possible to activate a monitoring by means of the procedure just mentioned, if the monitoring threshold has been exceeded, but the preprocessing threshold has not yet been exceeded. Monitoring can therefore begin which, in the case of some preprocessing methods, is the prerequisite for a subsequent preprocessing or at least facilitates or improves said preprocessing. For example, messages can be stored and evaluated in certain respects or a history based on the messages can be built up. During this process, the monitoring does not typically sort out any messages so that all of the messages are supplied to the applications or further different processing steps as long as the preprocessing threshold has still not been exceeded.

The monitoring threshold can, for example, be located between 25 s$^{-1}$ and 35 s$^{-1}$, in particular 30 s$^{-1}$.

It is understood that all of the methods described herein, in which an action is triggered in the event of a threshold being exceeded, for example monitoring or preprocessing being carried out, can also be accordingly carried out in the reverse order. The monitoring or the preprocessing can therefore be ended again, for example, if the respective threshold is fallen short of. In addition, it is understood that additional thresholds to those indicated can also be used in order to accordingly switch on or off functions of the preprocessing, stages of the preprocessing or other mechanisms. For example, a third threshold can therefore also be used. In this case, hystereses around the thresholds can also be used to avoid too frequent or hectic switching over.

It is, in addition, understood that parameters of the preprocessing can also be adjusted by means of thresholds. Examples of this are:

lowering/raising distance thresholds and/or time-to-collision thresholds, for example in a relevance filtering in the case of a rising/falling channel load;

deactivating/activating particular relevance filter algorithms, in particular more complex relevance filter algorithms, as well as additional calculations such as, for example, plausibility checks in the case of a rising/falling channel load;

deactivating/activating the filtering out of information, wherein other parts of the preprocessing such as the plausibility check remain active in the case of a rising/falling channel load.

In principle, a permanent adjustment of the parameters is also conceivable. This could, for example, be implemented in that the parameters are continually dynamically established on the basis of the channel load so that an adjustment is not only made in the event of thresholds being exceeded or fallen short of. Formulae or algorithms for establishing the parameters can therefore be stored, for example.

Adjusting distance thresholds on the basis of the channel load can produce a behavior which is comparable to the cell breathing known from the mobile communications sector.

In addition, the invention relates to a vehicle-to-X communication system which is configured to execute a method according to the invention according to one or more of the embodiments described herein. The vehicle-to-X communication system can, for example, comprise processor means and storage means, wherein program code is stored in the storage means, during the execution of which program code the processor means execute such a method.

In addition, an aspect of the invention relates to a computer-readable storage medium which contains program code, during the execution of which by a processor or by a vehicle-to-X communication system a method according to the invention according to one or more of the embodiments described herein is executed.

Both in the case of the vehicle-to-X communication system and the computer-readable storage medium, recourse can be had to all of the embodiments and variants of the method according to the invention described herein.

It is understood that a vehicle-to-X communication system can also be referred to as a vehicle-to-X communication module or can include such a vehicle-to-X communication module.

BRIEF DESCRIPTION OF THE DRAWINGS

The person skilled in the art will infer further features and advantages from the embodiment example which is described below with reference to the attached drawing, wherein FIG. 1 shows a vehicle-to-X communication module which is configured to execute a method according to the invention.

DETAILED DESCRIPTION OF THE PREFERRED EMBODIMENTS

FIG. 1 shows a vehicle-to-X communication module 10 which, in the present case, forms a vehicle-to-X communication system. The vehicle-to-X communication module 10 comprises a preprocessing module 20 which is configured to receive, preprocess and monitor vehicle-to-X messages from a vehicle-to-X communication. To this end, it is connected to an antenna which is only shown schematically and which is not described further.

The vehicle-to-X communication module 10 further comprises a buffer memory 30, in which the preprocessing module 20 stores received vehicle-to-X messages. In the buffer memory 30, in the present case, a total of six vehicle-to-X messages 41, 42, 43, 44, 45, 46 are stored, which are summarily referred to with the reference numeral 40. Applications or other units of the vehicle-to-X communication module 10 can extract the messages 40 from the buffer memory 30 and further process them.

By way of example, a first application 50 and a second application 55 are shown in the vehicle-to-X communication module 10. These are implemented in respective circuits. It is understood that a typical vehicle-to-X communication module 10 includes a plurality of different applications or can also make available messages to externally running applications.

In addition, the vehicle-to-X communication module 10 comprises a security buffer memory 60 and a security unit 65 connected therewith. All of the messages which are to be authenticated are written into the security buffer memory 60. The security unit 65 successively extracts the messages stored in the security buffer memory 60 and checks whether these originate from the indicated transmitter. The security buffer memory 60 is, in this case, configured as a first-in-first-out (FiFo) buffer memory.

In addition, the vehicle-to-X communication module 10 comprises an evaluation unit 70. The evaluation unit 70 comprises, in turn, an internal clock 75 which provides a local time reference.

The evaluation unit 70 is configured to execute a method according to an aspect of the invention according to a possible implementation. It is expressly pointed out that this simply represents a possible implementation of the method according to the invention and that a plurality of variants thereof is possible. It is, in addition, pointed out that not all of the signal paths are shown in FIG. 1, in order to increase clarity.

The evaluation unit 70 first provides each of the messages 40 stored by the preprocessing unit 20 in the buffer memory 30 with a time stamp, for which purpose the clock 75 is used.

After each incoming message it compares the time stamp of the message just received with the time stamp of the message previously received. A time interval is established as the difference between these two time stamps, which time interval indicates the difference between the times at which these messages were received and/or written into the buffer memory 30.

The evaluation unit 70 now establishes a first channel load parameter in that it calculates an average, in each case, over ten time intervals and calculates the inverse of an averaged time interval which is established in this way. This corresponds to a value which indicates an average arrival of messages per second.

In addition, the evaluation unit 70 constantly monitors the number of messages which are currently located in the security buffer memory 60. This value is multiplied by a factor of 10 and provided with the unit $s^{-1}$. The value established from this produces a second channel load parameter.

If one of the two channel load parameters exceeds a monitoring threshold of 30 $s^{-1}$, the evaluation unit 70 instructs the preprocessing unit 20 to start monitoring the received messages. This still does not mean that messages are filtered out, but monitoring functions which are required in order to quickly start a preprocessing are activated. For example, particular parameters of the received messages are saved and monitored.

If one of the two channel load parameters exceeds a preprocessing threshold of 50 $s^{-1}$, the evaluation unit 70 instructs the preprocessing unit 20 to perform a preprocessing. In this case, irrelevant or less relevant messages are filtered out and are not even written into the buffer memory 30. This significantly reduces the system load and it is ensured that the vehicle-to-X communication module 10 only processes as many received messages as it can actually process.

In the case of such an embodiment, it can be said, for example, that the higher of the two channel load parameters indicates the channel load. Therefore, in the case of the implementation described here, merely the higher of the two channel load parameters is considered so that in the event of one of the two channel load parameter values exceeding the two limits, the value of the other channel load parameter is no longer important. This corresponds to an embodiment in which the preprocessing and/or the monitoring are already activated, if signs of a possible system overload exist, in order to counteract an overloading of the vehicle-to-X communication module 10.

It is understood that the vehicle-to-X communication module 10 is typically installed in a motor vehicle, for example a car, a two-wheeled vehicle or a truck or is provided for such an installation and is used accordingly. It is, in addition, understood that the vehicle-to-X communication module 10 typically comprises interfaces with other vehicle components as well as additional functionalities. These will not be explained in more detail here in order to simplify the representation and description.

Generally, it should be noted that vehicle-to-X communication means, in particular, direct communication between vehicles and/or between vehicles and infrastructure facilities. For example, this can therefore be vehicle to-vehicle communication or vehicle to-infrastructure communication. Inasmuch as reference is made to communication between vehicles within the framework of this application, this can in principle be effected, for example, within the framework of vehicle-to-vehicle communication which typically takes place without relaying via a mobile network or a similar external infrastructure and which should therefore be delimited from other solutions which build, for example, on a mobile network. Vehicle-to X communication can take place, for example, using the IEEE 802.11p or IEEE 1609.4 standards. Vehicle-to-X communication can also be referred to as C2X communication. The subareas can be referred to as C2C (car-to-car) or C2I (car-to-infrastructure). The invention does not, however, explicitly exclude vehicle-to-X communication with relaying, for example, via a mobile network.

The mentioned steps of the method according to an aspect of the invention can be executed in the indicated order. However, they can also be executed in a different order. The method according to the invention can be executed in one of its embodiments, for example, with a specific set of steps in such a way that no further steps are executed. However, additional steps can in principle also be executed, including those which are not mentioned.

The claims associated with the application do not constitute a waiver of the attainment of more extensive protection.

If it emerges in the course of the process that a feature or a group of features is not absolutely necessary, the applicant is already striving now for a wording of at least one independent claim which no longer comprises the feature or group of features. This can be, for example, a sub-combination of a claim which exists on the date of filing or a sub-combination of a claim which exists on the date of filing, which is limited by additional features. Such claims needing to be reworded or combinations of features are to be understood to also be covered by the disclosure of this application.

It should further be noted that configurations, features and variants of the invention, which are described in the various embodiments or embodiment examples and/or which are shown in the figures, can be combined in any way whatsoever with each other.

Individual or multiple features can be exchanged with one another at will. Combinations of features resulting herefrom are to be understood to also be covered by the disclosure of this application.

References in the subordinate claims are not to be understood to constitute a waiver of the attainment of independent, objective protection for the features of the subordinate claims referring back to the principal claims. These features can also be combined at will with other features.

Features which are merely disclosed in the specification or features which are only disclosed in the specification or in a claim in conjunction with other features can, in principle, be of independent importance and essential to the invention. They can therefore also be individually incorporated into claims in order to delimit the invention from the prior art.

The invention claimed is:

1. A method for determining a channel load in a vehicle-to-X communication, comprising:
   receiving a number of vehicle-to-x messages,
   establishing a plurality of channel load parameters based on an amount of the vehicle-to-x messages received over a channel and a time interval between the vehicle-to-x messages received over the channel,
   determining a highest channel load parameter of the plurality of channel load parameters,
   establishing a channel load based on the highest channel load parameter,
   selecting a preprocessing action from a plurality of preprocessing actions based on the channel load, and
   preprocessing the vehicle-to-x messages based on the selected preprocessing action.

2. The method according to claim 1,
   wherein at least one of the plurality of channel load parameters is established by counting the number of vehicle-to-X messages received within a predefined period of time.

3. The method according to claim 1,
   wherein at least one of the plurality of channel load parameters is established by:
   storing each received vehicle-to-x message with a time stamp, from an internal clock,
   establishing a time interval between two successively received vehicle-to-x messages, and
   establishing the at least one of the plurality of channel load parameters based on the time interval, by inverting the time interval.

4. The method according to claim 3,
   wherein the at least one of the plurality of channel load parameters is established based on an average or a median of a predefined number of time intervals.

5. The method according to claim 1,
   wherein at least one of the plurality of channel load parameters is established by:
   storing each received vehicle-to-x message in a buffer memory, wherein applications read out vehicle-to-x messages cyclically from the buffer memory in each case, and
   establishing the at least one of the plurality of channel load parameters based on the number of vehicle-to-x messages stored in the buffer memory.

6. The method according to claim 1,
   wherein at least one of the plurality of channel load parameters is established by:
   storing each received vehicle-to-x message in a buffer memory, wherein applications read out vehicle-to-x messages cyclically from the buffer memory in each case,
   establishing a number of vehicle-to-x messages from the same transmitter, which are stored in the buffer memory, and
   establishing the at least one of the plurality of channel load parameters based on the number of vehicle-to-x messages from the same transmitter.

7. The method according to claim 6,
   wherein it is additionally established and considered on establishing the at least one of the plurality of channel load parameters how many vehicle-to-X messages from the same transmitter are of the same type.

8. The method according claim 1,
   wherein at least one of the plurality of channel load parameters is established by:
   storing vehicle-to-x messages, which are to be subjected to authentication, in a security buffer memory which is configured as a first-in-first-out (FiFo) buffer memory,
   reading out and authenticating the vehicle-to-x messages from the security buffer memory, and
   establishing the at least one of the plurality of channel load parameters based on the number of messages stored in the security buffer memory.

9. The method according to claim 1,
   wherein at least one of the plurality of channel load parameters is a value received from a communication chip, which value is indicative of the channel load.

10. The method according to claim 1,
    wherein an increased channel load is established during the step of establishing the channel load, if at least one of the plurality of channel load parameters indicates an increased channel load;
    and/or
    wherein an increased channel load is established during the step of establishing the channel load, if more than half of all the plurality of channel load parameters considered during the step of establishing the channel load indicate an increased channel load.

11. The method according to claim 1,
    wherein an increased channel load is only established during the step of establishing the channel load, if at least one of the plurality of channel load parameters indicate an increased channel load over a predetermined time period;
    and/or
    wherein a temporal low-pass is applied during the step of establishing the channel load.

12. The method according to claim 1,
    wherein each vehicle-to-X message is weighted with a complexity factor when used in the establishment at least one of the plurality of channel load parameters,
    wherein the respective complexity factor is preferably a measure of the computing load to be expected during further processing steps.

13. A method for adjusting a preprocessing in a vehicle-to-X communication, comprising:
    receiving a number of vehicle-to-x messages,
    establishing a plurality of channel load parameters based on the vehicle-to-x messages, comparing the plurality of channel load parameters to a first preprocessing threshold and to a second preprocessing threshold greater than the first preprocessing threshold,
    carrying out monitoring of the vehicle-to-x messages if one of more of the plurality of channel load parameters is greater than the first preprocessing threshold and less than the second preprocessing threshold, and
    carrying out a preprocessing by filtering out the vehicle-to-x messages if one or more of the plurality of channel load parameters is greater than the second preprocessing threshold.

14. The method according to claim 13, further comprising:
    establishing whether the channel load is increased above a preprocessing threshold, wherein the monitoring threshold is lower than the preprocessing threshold, and as a function thereof carrying out monitoring if the channel load is increased above the monitoring threshold, as well as not carrying out monitoring if the channel load is not increased above the monitoring threshold.

15. A vehicle-to-X communication system which is configured to execute a method according to claim 1.

16. The method according to claim 2,
wherein at least one of the plurality of channel load parameters is established by:
storing each received vehicle-to-x message with a time stamp, from an internal clock,
establishing a time interval between two successively received vehicle-to-x messages, and establishing the at least one of the plurality of channel load parameters based on the time interval, by inverting the time interval.

17. A non-transitory computer-readable storage medium which contains program code, during the execution of which by a processor or by a vehicle-to-X communication system a method according to claim 1 is executed.

* * * * *